United States Patent [19]

Masujima et al.

[11] 4,447,549
[45] May 8, 1984

[54] NON-LINEAR DIELECTRIC ELEMENT

[75] Inventors: Sho Masujima, Tokyo; Masahide Shibuya, Nikahomachi; Iwaya Shoichi, Kisagatamachi; Kenichi Umeda, Honjo; Yasunobu Oikawa, Nikahomachi; Hisao Abe, Kisagatamachi; Yoshifumi Midori, Honjo; Shinobu Fujiwara, Nikahomachi; Nobuaki Kikuchi, Kisagatamachi, all of Japan

[73] Assignee: TDK Kabushiki Kaisha, Tokyo, Japan

[21] Appl. No.: 476,250

[22] Filed: Mar. 22, 1983

Related U.S. Application Data

[63] Continuation of Ser. No. 261,914, May 8, 1981, abandoned, which is a continuation of Ser. No. 087,408, Oct. 22, 1979, abandoned.

[30] Foreign Application Priority Data

Oct. 20, 1978 [JP] Japan ................................ 53-129233

[51] Int. Cl.$^3$ .............................................. C04B 35/46
[52] U.S. Cl. .................................... 501/138; 501/137; 501/139
[58] Field of Search ........................ 501/137, 138, 139

[56] References Cited

U.S. PATENT DOCUMENTS

| | | | |
|---|---|---|---|
| 2,402,515 | 6/1946 | Wainer | 106/73.31 |
| 2,955,048 | 10/1960 | Plessner et al. | 106/73.31 |
| 3,041,189 | 6/1962 | Herbert | 106/73.31 |
| 3,103,440 | 9/1963 | Cline et al. | 106/73.31 |
| 3,103,441 | 9/1963 | Cline et al. | 106/73.31 |
| 3,345,189 | 10/1967 | Fujiwara et al. | 106/73.31 |
| 3,637,532 | 1/1972 | Ramisch et al. | 106/73.31 |
| 3,962,146 | 6/1972 | Matsuoka et al. | 106/73.31 |
| 4,055,438 | 10/1977 | Wede et al. | 106/73.31 |
| 4,119,886 | 10/1978 | Jyomura et al. | 106/73.31 |

FOREIGN PATENT DOCUMENTS

| | | | |
|---|---|---|---|
| 2637762 | 2/1978 | Fed. Rep. of Germany | 106/73.31 |
| 51-20716 | 6/1976 | Japan | 106/73.31 |
| 52-4757 | 2/1977 | Japan | 106/73.31 |
| 52-4758 | 2/1977 | Japan | 106/73.31 |

OTHER PUBLICATIONS

Matsuyama et al., "Pulse-Like Voltage Generation Using Polarization Reversal of Ferroelectric Ba-Substituted Pb (Zr, Ti)O$_3$ Ceramics", Japan Journal Applied Physics, vol. 16, 1977, No. 10, pp. 1871–1872.

Anderson, J. R., "Ferroelectric Storage Elements for Digital Computers and Switching Systems", Electrical Engineering, Oct. 1952, pp. 916–922.

*Primary Examiner*—Mark Bell
*Attorney, Agent, or Firm*—Armstrong, Nikaido, Marmelstein & Kubovcik

[57] ABSTRACT

A D-E hysteresis loop of ferroelectrics known in the art has a square shape when the ferroelectrics are a BaTiO$_3$ single crystal. Such ferroelectrics are used as a non-linear dielectric element of, for example a pulse generating device. The non-linear dielectric element according to the present invention consists of a polycrystal, which is mainly composed of BaTiO$_3$ and has the chemical composition expressed by the formula A$_y$B$_z$O$_3$, wherein the molar ratio of y/z ranges from 0.92 to 0.99. The non-linearity is excellent and the temperature dependence of the A$_y$B$_z$O$_3$ composition is considerably low.

6 Claims, 9 Drawing Figures

NON-LINEAR DIELECTRIC ELEMENT

This application is a continuation, of application Ser. No. 261,914, filed May 8, 1981, now abandoned, which is a continuation of application Ser. No. 087,408, filed Oct. 22, 1979, now abandoned.

The present invention relates to a non-linear dielectric element and, more particularly, a non-linear dielectric element which utilizes the non-linearity of a dielectric constant that depends on an electric field applied to a polycrystal composed of $BaTiO_3$.

$BaTiO_3$ is a typical ceramic of $ABO_3$ type ferroelectrics having a perovskite structure. It is known that the $BaTiO_3$ single crystal property of the dielectric constant variance depending upon the magnitude of the electric field can be utilized in a non-linear type saturable element. Furthermore, it is known that the $BaTiO_3$ single crystal property of exhibiting a D-E hysteresis can be utilized in a memory storage element and a logic operational circuit element. It has been expected, due to the employment of the $BaTiO_3$ single crystal in the elements mentioned above, that the following advantages over the conventional polycrystalline $BaTiO_3$ are achieved. That is: the maximum usable frequency of the electric current in the elements is enhanced; the electric power consumption in the elements is considerably reduced, and; elements having a large capacity and a small size can easily be fabricated. However, it is not advisable to produce the elements mentioned above from the $BaTiO_3$ single crystal on an industrial scale, because the $BaTiO_3$ single crystal can only be produced by an expensive and complicated process of crystal growth.

A novel employment of the $BaTiO_3$ single crystal is disclosed in Japanese Published Patent Application No. 48-28726. The $BaTiO_3$ single crystal is used, according to this disclosure, as the non-linear saturable element in a contactless starting device of a fluorescent lamp, a mercury lamp, and discharge tubes, such as a sodium-vapor lamp. However, the contactless starting device using the single crystal is disadvantageously expensive due to the cost of the single crystal, which is produced by a flux method or a fusing method.

It is disclosed in Japanese Laid-Open Patent Application No. 52-146069 that the $ABO_3$ type ferroelectrics can be produced by blending such powder components as $PbO$, $ZrO_2$, $BaTiO_3$, $SrTiO_3$ and the like, and then, sintering the blended powders. Although a non-linear dielectric element having a polycrystalline structure can be produced by the disclosed process, the non-linearity of this element is not sufficient for the starting device mentioned above. In Japanese Laid-Open Patent Application No. 52-146069, the surface of the non-linear element, having a thickness of about 200 $\mu$m, is subjected to a miror finish or etching treatment, so as to obtain an excellent saturable curve of the D-E hysteresis loop. However, such treatment is complicated and the thin non-linear element does not possess high mechanical strength or resistance against a pulse voltage generated in the starting device.

It is an object of the present invention to provide a polycrystalline non-linear dielectric element which exhibits an excellent non-linear property and is capable of being produced by a simple process.

In accordance with the object of the present invention, there is provided a non-linear dielectric element consisting of a polycrystal, which is mainly composed of $BaTiO_3$ and has the chemical composition expressed by the formula $A_yB_zO_3$, wherein the molar ratio of y/z ranges from 0.92 to 0.99.

Other objects and features of the present invention are explained by referring to the drawings, wherein.

Figure 1:
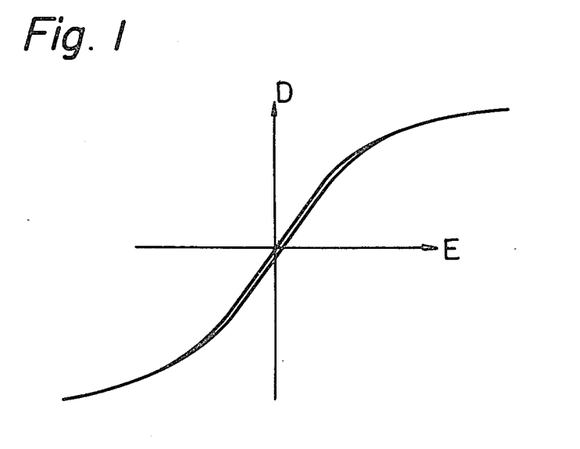
FIG. 1 illustrates a D-E hysteris loop of a linear dielectric element.

In FIG. 1, the D (dielectric flux density)-E(electric field) hysteresis loop of a conventional $BaTiO_3$ (barium titanate) polycrystal is illustrated. As seen in FIG. 1, the D-E hysteresis loop of the conventional $BaTiO_3$ (barium titanate) exhibits a certain saturation characteristic, but the slope of the D-E hysteresis loop is gradual. Accordingly, the conventional $BaTiO_3$ polycrystal is not used as the non-linear dielectric material. In addition, the dielectric constant of the conventional $BaTiO_3$ unstably varies in accordance with temperature, with the result that such $BaTiO_3$ exhibits an unstable non-linear property as explained in detail herein below.

Figure 2:
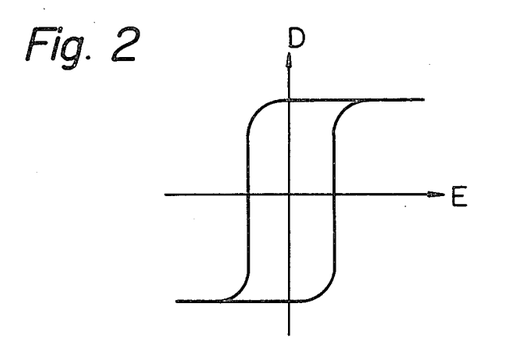
FIG. 2 illustrates a D-E hysteresis loop of a non-linear dielectric element.

It was discovered by the present Inventors that the $BaTiO_3$ polycrystal is provided with the desirable D-E hysteresis loop as illustrated in FIG. 2 by adjusting the molar ratio of y/z, wherein y and z designate the components A and B, respectively, of a compound $A_yB_zO_3$. In this compound, the barium and titanium elements of $BaTiO_3$ are expressed as the components A and B, respectively. It was also discovered by the present inventors that the most non-linear property of the capacity-voltage relationship is obtained with regard to the $BaTiO_3$ polycrystal by not adjusting the molar ratio of y/z to 1.00 but by adjusting the molar ratio in the range of from 0.92 to 0.99, preferably from 0.95 to 0.98. The non-linear property mentioned above becomes prominent when the shape of the D-E hysteresis curve is close to a square. In the D'-E hysteresis curve which exhibits an almost square curve, the difference between the slopes of the hysteresis curve is large, and the non-linear property is provided. A specific embodiment of the non-linear dielectric element having the composition of $Ba_{0.98}Ti_{1.00}O_3$ exhibits the non-linear D-E hysteresis loop as illustrated in FIG. 3.

Figure 3:
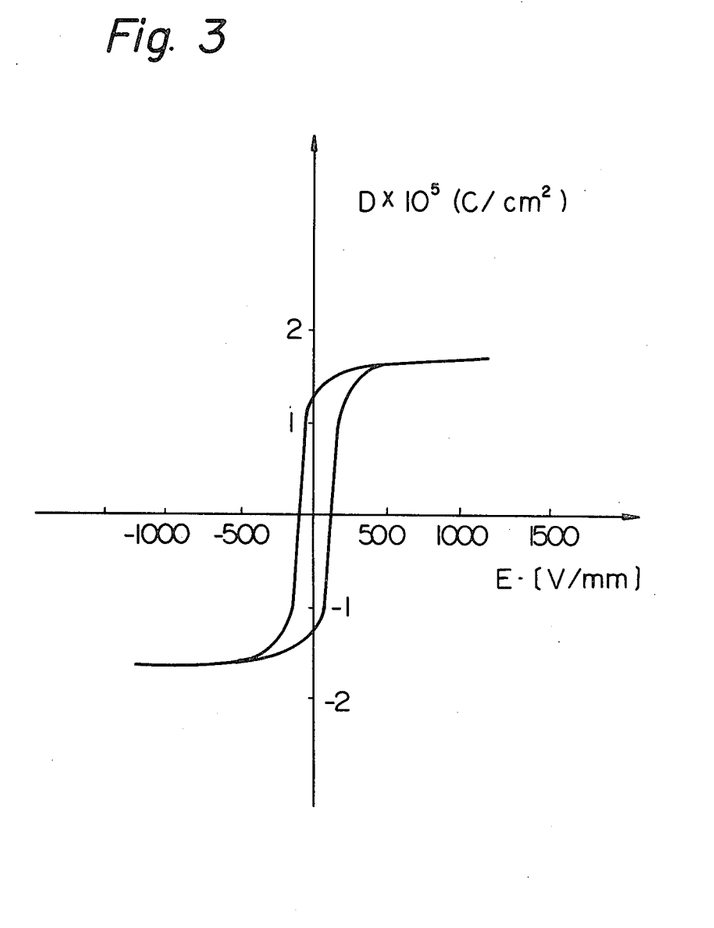
FIG. 3 illustrates the D-E hysteresis loop of an embodiment of the non-linear dielectric element according to the present invention.
Figure 4:
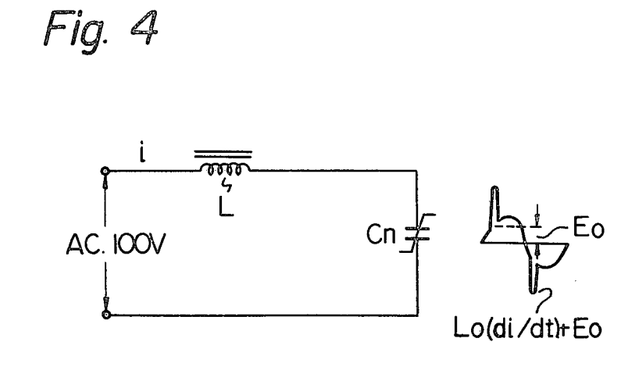
FIG. 4 illustrates an electric circuit for generating a pulse voltage comprising the non-linear dielectric element.

It is difficult to express quantitatively the non-linear property by illustrating shapes of the D-E hysteresis loop as in FIGS. 1 and 3. Accordingly, the pulse voltage is used hereinafter to quantitatively express the non-linear property of the $BaTiO_3$ polycrystals. Referring to FIG. 4, an alternating voltage of 100 V is applied through the stabilizer L to the non-linear dielectric element Cn. The voltage measured at both ends of the non-linear dielectric element Cn includes the alternating voltage and the pulse voltage, which is overlapped on the alternating voltage of the Eo value. The pulse voltage is caused by a counter electromotive force, which is proportional to the inductance Lo of the stabilizer L, while the counter electromotive force is caused by the fact that the abrupt change of the charging current (di/dt) of the non-linear dielectric element Cn occurs at the voltage value of Eo. Such abrupt change results from the abrupt change in the slope of the non-linear D-E hysteresis loop. The mechanism that generates the pulse voltage is explained in detail with reference to FIG. 6.

Figure 6:
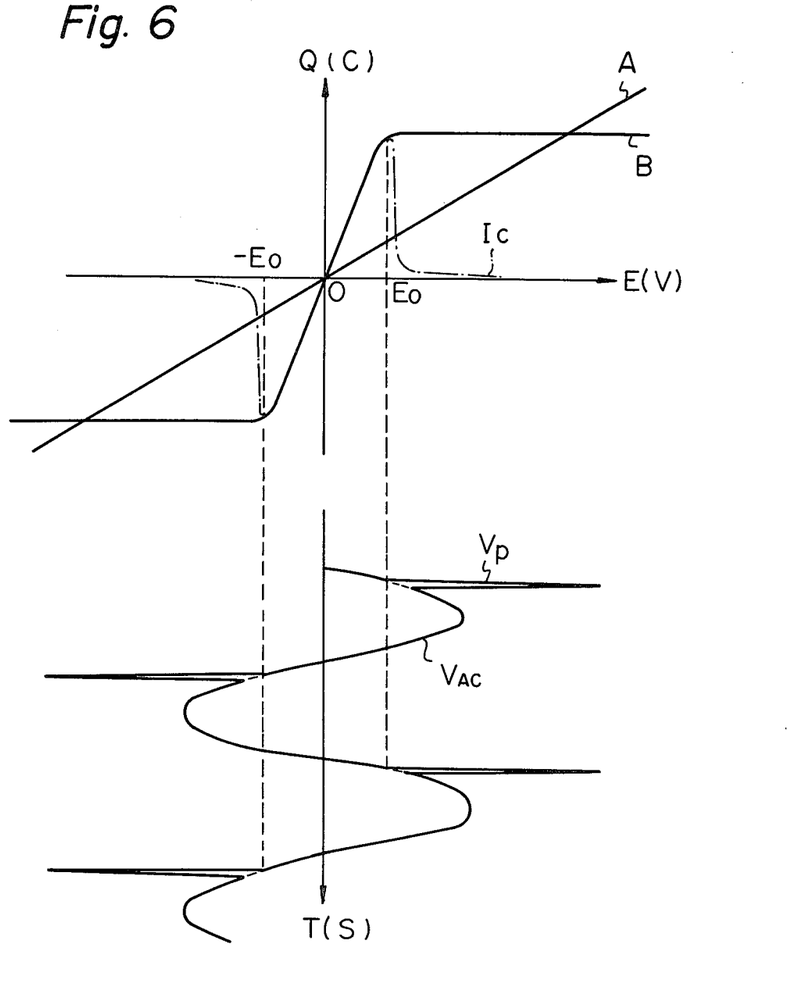
FIG. 6 illustrates the principle of operation of the non-linear dielectric element.

Referring to FIG. 6, the electric charge (Q) of the linear dielectric element is proportional to the electric field (E) as indicated by the line A. However, in the non-linear dielectric elements, the electric charge (Q) is constant when the electric field is more than Eo as seen by line B. Since there is a relationship of $Q<C>=C(F)xV(V)$, between the electric charge (Q), the capcity (C) and voltage (V), the electric chare stored in the non-linear dielectric element is saturated at a voltage corresponding to or higher than the electric field of Eo or $-$Eo. As a result of the saturation of the stored electric charge, the change of the charged current (Ic) is abruptly decreased as illustrated in the upper half of FIG. 6. Referring to the lower half of FIG. 6, the change of the alternating voltage ($V_{Ac}$) applied to the non-linear dielectric element Cn (FIG. 4) is apparent. When the alternating voltage ($V_{Ac}$) arrives at levels corresponding to the electric field of Eo and $-$Eo, the counter electromotive force, which is proportional to $L_0X(di/dt)$, and the pulse voltage Vp are generated in the stabilizer L. It will therefore be understood from the explanation in referring to FIGS. 4 and 6 that the pulse voltage (Vp) is proportional to the degree of non-linearity of the non-linear dielectric element, i.e. the degree of difference in the slopes of curve B at the electric field of Eo.

In the investigation conducted by the present Inventors, it was discovered that, when the molar ratio of y/z of the compound of $A_yB_zO_3$ does not fall within the range of from 0.92 to 0.99, the pulse voltage is considerably decreased. It was also discovered by the present Inventors that, when the molar ratio of y/z is in the range mentioned above, the pulse voltage exhibits a considerably low dependence upon the ambient temperature. It is therefore possible to provide a non-linear dielectric element with a D-E hysteresis loop which is stable in an ambient temperature change. When the molar ratio of y/z is in the range mentioned above, it is possible to provide the non-linear dielectric element with the additional desirable properties of high dielectric constant ($\epsilon$s), low dielectric loss (tan $\delta$) and hih insulation resistance (IR).

It is possible to advantageously produce the non-linear dielectric element of the polycrystal according to the present invention by means of the conventional sintering method in the ceramic engineering, without using special hot pressing or etching methods. When the molar ratio of y/z is in the range mentioned above, the so produced non-linear dielectric element is provided with a preferable polycrystalline structure. The present Inventors discovered by inspecting the surface of the sintered non-linear dielectric element that at a molar ratio of y/z of less than 0.92, the amporphous boundaries of the crystalline grains were too large. On the other hand, when the molar ratio of y/z is more than 0.99, the sintering of the dielectric element mainly composed of BaTiO$_3$ becomes considerably difficult.

In an embodiment of the present invention, the chemical composition of $A_yB_zO_3$ is $Ba_y(Ti_xSn_{1-x})_zO_3$, wherein the amount (x) of titanium not replaced by tin is in the range of from 0.90 to 0.98, preferably from 0.92 to 0.96. When the amount (x), hereinafter refered to as a titanium amount, does not fall within the range of from 0.90 to 0.98, the pulse voltage is too low. Due to the partial replacement of titanium by tin and by adjusting the titanium amount (x) in the range of from 0.90 to 0.98, it is possible to provide the non-linear dielectric element with a particularly high pulse voltage.

In another embodiment of the present invention, not more than 10 molar %, preferably from 0 to 6 molar %, more preferably from 0 to 3 molar %, of the barium of the chemical composition of $Ba_y(Ti_xSn_{1-x})_zO_3$ mentioned above, is replaced by at least one element selected from the group consisting of strontium (Sr), calcium (Ca) and lead (Pb).

In still another embodiment of the present invention, the non-linear dielectric element comprises at least one oxide selected from the group consisting of manganese oxide and chromium oxide in an amount of from 0.02 to 0.5%, preferably from 0.03 to 0.3% by weight based on 100% by weight of the $A_yB_zO_3$ ceramic composition mentioned above. In the sintering of a ceramic of the non-linear dielectric element, the addition of manganese and chromium oxides prevents the reducing of the $A_yB_zO_3$ ceramic composition and improves the sintering properties, thereby obtaining a dense homogeneous polycrystal. When the amount of additive exceeds 0.5% by weight, the electric properties, particularly the pulse voltage, of the non-linear dielectric element mainly composed of BaTiO$_3$ is disadvantageously deteriorated. When the amount of additive is less than 0.02%, no appreciable improvement is achieved by the additive. The additive may be added to the basic ingredients of the $A_yB_zO_3$ ceramic composition in any form of oxide, carbonate and other compounds, which are decomposed to an oxide state during the sintering.

In a further embodiment of the present invention, the non-linear dielectric element comprises a minor but effective amount of a mineralizer additive, which is at least one selected from the group consisting of a niobium oxide, a silicon oxide, an oxide of an iron group element, a clay material and a compound of rare earth element. The mineralizer additive prevents the reduction of the $A_yB_zO_3$ ceramic composition and promotes a densification phenomenon during sintering. The maximum amount of the mineralizer additive is 0.5%, preferably 0.3% by weight based on 100% by weight of the $A_yB_zO_3$ ceramic composition.

In a still further embodiment of the present invention, a non-linear dielectric element having the composition mentioned above is used in a pulse generating device, a contactless starting device of lamps, a memory storage element and a logic operational circuit element. Since the non-linear dielectric element according to the present invention exhibits a high dielectric constant, low dielectric loss and an extremely stable temperature dependence of non-linearity as compared with that of the BaTiO$_3$ single crystal, the non-linear dielectric element can practically be employed for the devices and elements mentioned above.

Figure 5:
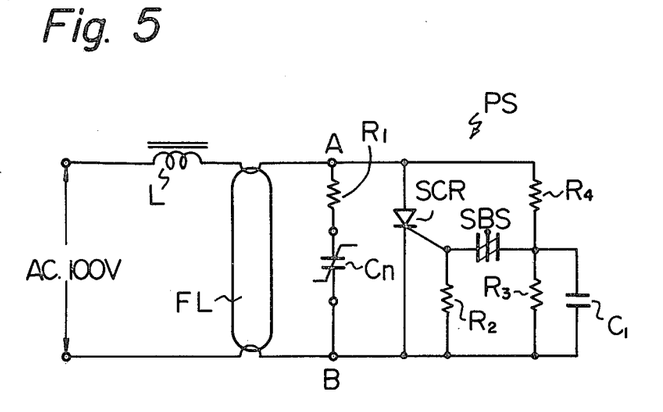
FIG. 5 illustrates an electric circuit for lighting a fluorescent lamp.

In FIG. 5, an electric circuit of a lighting device of a fluorescent lamp is shown. A source voltage (AC. 100 V) is applied to the terminals of a fluorescent lamp (FL) via a stabilizer (L). A pulse generating circuit (between A and B), and a preheating and switching circuit (PS) are connected in parallel to both filaments of the fluorescent lamp (FL). The pulse generating circuit consists of a resistance ($R_1$) and the non-linear dielectric element (Cn), which are connected in series. The preheating and switching circuit comprises a thyristor (SCR) and resistors ($R_3$, $R_4$), which are connected in series to one of the terminals of the thyristor (SCR). A capacitor ($C_1$) is connected in parallel to the resistor ($R_3$). A silicon bilateral switch (SBS) is connected to the gate of the thyristor (SCR) and the connection point of the resistors ($R_4$, $R_3$). The electric circuit illustrated in FIG. 5 is known and is an application of an electric circuit illustrated in FIG. 4 to the lighting device of a fluorescent lamp. The electric circuit illustrated in FIG. 5 functions as follows. The voltage, having a value almost the same as the source voltage is applied to the terminals of the resistors ($R_3$, $R_4$), at a positive rising quarter cycle of the sine wave of the alternating current. This applied voltage is divided the resistors ($R_3$, $R_4$) and, then, applied to the silicon bilateral switch (SBS). When the voltage applied to the silicon bilateral switch (SBS) reaches the breakover voltage thereof, the silicon bilateral switch turns on, with the result that a current is conducted to the gate of thyristor (SCR), which then turns on. The current can then be conducted through the stabilizer (L), one of the filaments of the fluorescent lamp (FL), the thyristor (SCR) and the other filament, and therefore, these filaments are preheated. When the preheating current is decreased to a level lower than the holding current of the thyristor (SCR), directly before entering the negative half cycle of the alternating current, the thyristor (SCR) turns off. Due to the inductive load of the stabilizer L, the phase of the alternating current is delayed from the phase of the voltage. Therefore, when the thyristor (SCR) turns off, the voltage enters the positive cycle, with the result that the non-linear dielectric element is abruptly charged by the voltage between the point A, at which the voltage is in a negative cycle, and the point B, at which the voltage is in a positive cycle. Shortly after the charging of the non-linear dielectric element is started, the stored electric charges in the non-linear dielectric element are saturated and the charging current Ic (FIG. 6) is steeply decreased to a level such as illustrated in FIG. 6. As a result, a counter electromotive force and pulse voltage are generated. When the filaments of the fluorescent lamp (FL) are completely preheated, the fluorescent lamp is triggered or lighted by the pulse voltage. The voltage between the terminals of the fluorescent lamp (FL) then becomes low. It is possible to prevent the malfunction of the thyristor (SCR) due to the voltage change after the lighting of the fluorescent lamp, when the resistance of the resistor ($R_4$) and the breakover voltage of the silicon bilateral switch (SBS) are selected so as not to increase the voltage divided by the resistors ($R_3$, $R_4$) to a level higher than the break over voltage. Since the pulse voltage generated by the non-linear dielectric element according to the present invention is generally high, commercially available fluorescent lamps can be reliably lighted. It is be noted that the pulse voltage is sufficiently high for lighting the fluorescent lamps at an ambient temperature of from $-30°$ C. to $60°$ C. When the non-linear dielectric element comprises manganese oxide and/or chromium oxide in an amount of from 0.02 to 0.5% by weight, preferably from 0.05 to 0.1%, based on the compound of $A_yB_zO_3$, the pulse voltage can be advantageously increased to, for example, 400 V or higher.

The present invention will now be explained in further detail by way of examples.

EXAMPLE 1

Starting materials in the form of a powder, i.e. the powder of $BaCO_3$, $TiO_2$, $SnO_2$, PbO, CaO, and SrO, were mixed so as to obtain the mixture compositions as shown in Table 1, below. These starting materials were mixed by means of a wet process using a porcelain pot and, then, an agate bowl. The mixtures were dried to remove the water and, then, presintered at $1150°$ C. for a period of 2 hours. The presintered mixtures were crushed and mixed by means of a wet process using the porcelain pot and the agate bowl. After vaporizing the water from the mixtures, an adequate amount of binder was added to the mixtures, which were then shaped under pressure, using a 10 ton press, to discs having a diameter of 1.65 mm and a thickness of 0.45 mm. The discs were subjected to a final sintering at $1300°$ to $1400°$ C. for 2 hours, to thereby obtain non-linear dielectric elements. The dielectric constant ($\epsilon_s$), the dielectric loss at 1 KHz (tan $\delta$) and the insulation resistance (IR) of these non-linear dielectic elements were measured. A silver electrode was baked on both surfaces of the dielectric elements, which were connected, as a non-linear dielectric element Cn, in a lighting device as shown in FIG. 5. The pulse voltage was measured in the electric circuit of FIG. 5. The measuring results are shown in Table 1 and the resultant compositions of the dielectric elements are shown in Table IV.

TABLE I

| sample No. | Proportion of Ingredients (mol %) | | | | | Y/Z | x | Amount of Ba replaced by Sr, Ca and Pb | Electric Properties | | | Pulse Voltage (V) |
|---|---|---|---|---|---|---|---|---|---|---|---|---|
| | $BaTiO_3$ | $BaSnO_3$ | $SrTiO_3$ | $PbTiO_3$ | $CaTiO_3$ | | | | $\epsilon_s$ | tan $\delta$(%) | IR(M$\Omega$) | |
| 1* | 100 | 0 | 0 | 0 | 0 | 0.98 | 1.00 | 0 | 1700 | 0.5 | $4 \times 10^4$ | 300 |
| 2 | 98 | 2 | 0 | 0 | 0 | 0.98 | 0.98 | 0 | 2530 | 0.6 | $1.3 \times 10^4$ | 580 |
| 3 | 96 | 4 | 0 | 0 | 0 | 0.98 | 0.96 | 0 | 1870 | 1.2 | $1.6 \times 10^4$ | 900 |
| 4 | 94 | 6 | 0 | 0 | 0 | 0.98 | 0.94 | 0 | 2360 | 1.2 | $1.7 \times 10^4$ | 910 |
| 5 | 92 | 8 | 0 | 0 | 0 | 0.98 | 0.92 | 0 | 4800 | 2.0 | $3 \times 10^4$ | 700 |
| 6 | 90 | 10 | 0 | 0 | 0 | 0.98 | 0.90 | 0 | 6740 | 2.9 | $1.8 \times 10^4$ | 650 |
| 7* | 88 | 12 | 0 | 0 | 0 | 0.98 | 0.88 | 0 | 9630 | 2.2 | $1.5 \times 10^4$ | 250 |
| 8 | 93.06 | 5.94 | 1 | 0 | 0 | 0.98 | 0.9406 | 1 | 3270 | 0.7 | $2 \times 10^4$ | 850 |
| 9 | 89.30 | 5.70 | 5 | 0 | 0 | 0.98 | 0.9430 | 5 | 4910 | 0.9 | $2.2 \times 10^4$ | 720 |
| 10 | 89.1 | 9.9 | 0 | 1 | 0 | 0.98 | 0.9010 | 1 | 4870 | 1.3 | $2 \times 10^4$ | 780 |
| 11 | 85.5 | 9.5 | 0 | 5 | 0 | 0.98 | 0.9050 | 5 | 5510 | 0.8 | $2.4 \times 10^4$ | 600 |
| 12 | 93.06 | 5.94 | 0 | 0 | 1 | 0.98 | 0.9406 | 1 | 6530 | 1.1 | $2 \times 10^4$ | 550 |
| 13 | 89.30 | 5.70 | 0 | 0 | 5 | 0.98 | 0.9430 | 5 | 6400 | 1.2 | $3 \times 10^4$ | 480 |

TABLE I-continued

| sample No. | Proportion of Ingredients (mol %) | | | | | Y/Z | x | Amount of Ba replaced by Sr, Ca and Pb | Electric Properties | | | Pulse Voltage (V) |
|---|---|---|---|---|---|---|---|---|---|---|---|---|
| | $BaTiO_3$ | $BaSnO_3$ | $SrTiO_3$ | $PbTiO_3$ | $CaTiO_3$ | | | | $\epsilon_s$ | tan δ(%) | IR(MΩ) | |
| 14 | 93.06 | 5.94 | 0.5 | 0.5 | 0 | 0.98 | 0.9406 | 1 | 4420 | 0.9 | $1.7 \times 10^4$ | 520 |
| 15 | 89.30 | 5.70 | 2.5 | 2.5 | 0 | 0.98 | 0.9430 | 5 | 4760 | 1.7 | $1.2 \times 10^4$ | 460 |
| 16* | 94 | 6 | 0 | 0 | 0 | 1.02 | 0.94 | 0 | 3050 | 2.0 | $1 \times 10^4$ | 350 |
| 17* | 94 | 6 | 0 | 0 | 0 | 1.00 | 0.94 | 0 | 2520 | 1.3 | $1 \times 10^4$ | 450 |
| 18 | 94 | 6 | 0 | | 0 | 0.96 | 0.94 | 0 | 2700 | 0.7 | $2.7 \times 10^4$ | 890 |
| 19 | 94 | 6 | 0 | | 0 | 0.94 | 0.94 | 0 | 2560 | 0.8 | $1.9 \times 10^4$ | 730 |
| 20 | 94 | 6 | 0 | 0 | 0 | 0.92 | 0.94 | 0 | 2200 | 0.9 | $1.5 \times 10^4$ | 550 |
| 21* | 94 | 6 | 0 | 0 | 0 | 0.90 | 0.94 | 0 | 2000 | 1.5 | $1 \times 10^4$ | 390 |

Note:
Asterisk (*) mark indicates a control sample

TABLE IV

Figure 7:
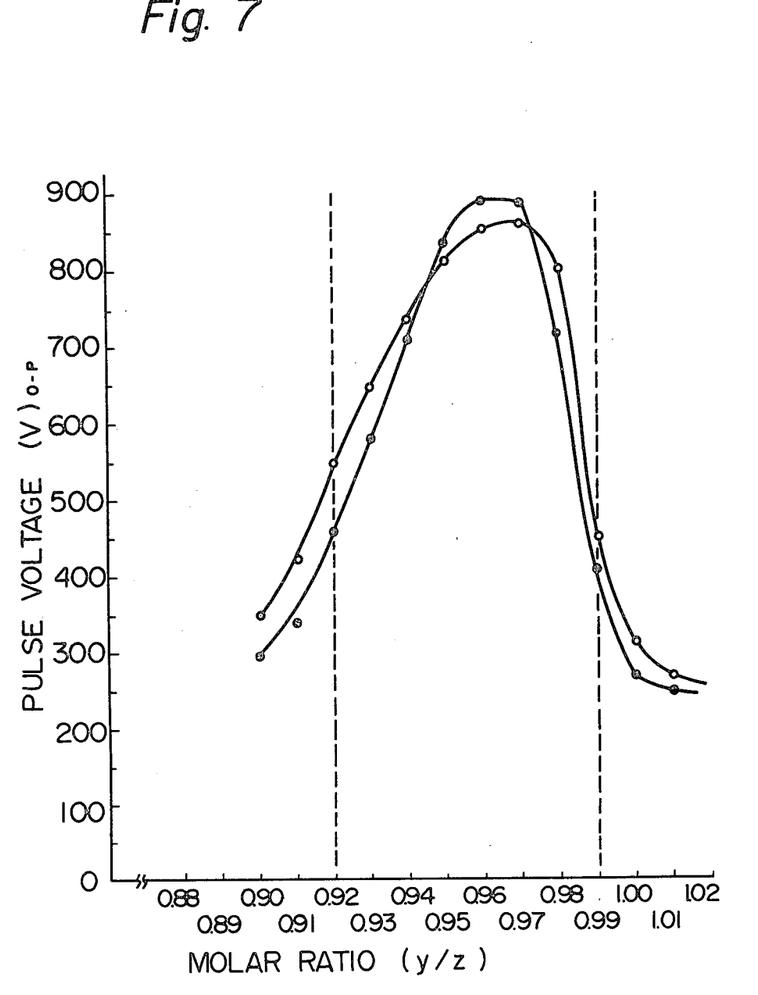
FIG. 7 is a graph indicating the relationship between the molar ratio of (y/z) in the $A_yB_zO_3$ type barium titanate polycrystal and a pulse voltage, which is applied to both ends of the fluorescent lamp in FIG. 5.

| SAMPLE NO. | COMPOSITION |
|---|---|
| 1 | $Ba_{0.98} Ti O_3$ |
| 2 | $Ba_{0.98} (Ti_{0.98} Sn_{0.02}) O_3$ |
| 3 | $Ba_{0.98} (Ti_{0.96} Sn_{0.04}) O_3$ |
| 4 | $Ba_{0.98} (Ti_{0.94} Sn_{0.06}) O_3$ |
| 5 | $Ba_{0.98} (Ti_{0.92} Sn_{0.08}) O_3$ |
| 6 | $Ba_{0.98} (Ti_{0.90} Sn_{0.10}) O_3$ |
| 7 | $Ba_{0.98} (Ti_{0.88} Sn_{0.12}) O_3$ |
| 8 | $(Ba_{0.99} Sr_{0.01})_{0.98} (Ti_{0.9406} Sn_{0.0594}) O_3$ |
| 9 | $(Ba_{0.95} Sr_{0.05})_{0.98} (Ti_{0.9430} Sn_{0.0570}) O_3$ |
| 10 | $(Ba_{0.99} Pb_{0.01})_{0.98} (Ti_{0.9010} Sn_{0.099}) O_3$ |
| 11 | $(Ba_{0.95} Pb_{0.05})_{0.98} (Ti_{0.9050} Sn_{0.095}) O_3$ |
| 12 | $(Ba_{0.99} Ca_{0.01})_{0.98} (Ti_{0.9406} Sn_{0.0594}) O_3$ |
| 13 | $(Ba_{0.95} Ca_{0.05})_{0.98} (Ti_{0.9430} Sn_{0.0570}) O_3$ |
| 14 | $(Ba_{0.99} Sr_{0.005} Pb_{0.005})_{0.98} (Ti_{0.9406} Sn_{0.0594}) O_3$ |
| 15 | $(Ba_{0.95} Sr_{0.025} Pb_{0.025})_{0.98} (Ti_{0.9430} Sn_{0.0570}) O_3$ |
| 16 | $Ba_{1.02} (Ti_{0.94} Sn_{0.06}) O_3$ |
| 17 | $Ba (Ti_{0.94} Sn_{0.06}) O_3$ |
| 18 | $Ba_{0.96} (Ti_{0.94} Sn_{0.06}) O_3$ |
| 19 | $Ba_{0.94} (Ti_{0.94} Sn_{0.06}) O_3$ |
| 20 | $Ba_{0.92} (Ti_{0.94} Sn_{0.06}) O_3$ |
| 21 | $Ba_{0.90} (Ti_{0.94} Sn_{0.06}) O_3$ | a molar ratio y/z of 0.97, were produced by the same procedure as in Example 1. The titanium amount (x) was 0.94. The pulse voltages measured at 20° C. are shown in FIG. 7, wherein the curve -o- indicates an addition of 0.1% of $MnCO_3$ and the curve -●- indicates an addition of 0.04% of $MnCO_3$ and 0.04% of $Cr_2O_3$. As is apparent from FIG. 7, the pulse voltage is extremely low at the molar ratio of y/z of more than 0.99 and less than 0.92.

EXAMPLE 3

Into 100 wt% of a non-linear dielectric element having a composition of $Ba_{0.97-0.99} (Ti\ 0.94\ Sn\ 0.06)_{1.00} - O_3$, additives as shown in Table II were added. The pulse voltage was measured by the same method as mentioned in Example 1. The source voltage (AC. 100 V in FIG. 5) was varied and the minimum voltage for lighting the fluorescent lamp was measured. The composition, pulse voltage and the minimum lighting voltage are shown in Table II.

EXAMPLE 2

Non-linear dielectric elements composed of 94 molar % of $BaTiO_3$ and 6% molar % of $BaSnO_3$, and having

TABLE II

| Sample No. | Mineralizer | | Y/Z | Electric Properties | | | | Minimum Lighting Voltage |
|---|---|---|---|---|---|---|---|---|
| | Kind | Amount (%) | | $\epsilon_s$ | tan δ(%) | IR(MΩ) | Pulse Voltage (V) | |
| 22 | $MnCO_3$ | 0 | 0.98 | 6800 | 4.3 | $1 \times 10^3$ | 250 | 130 |
| 23 | " | 0.02 | 0.97 | 3100 | 1.2 | $1 \times 10^4$ | 410 | 92 |
| 24 | " | 0.1 | 0.97 | 2400 | 0.7 | $2 \times 10^4$ | 770 | 85 |
| 25 | " | 0.3 | 0.98 | 2610 | 0.6 | $2 \times 10^4$ | 570 | 88 |
| 26 | " | 0.5 | 0.99 | 3000 | 0.8 | $2.7 \times 10^4$ | 420 | 92 |
| 27 | " | 0.7 | 0.97 | 2860 | 1.0 | $1 \times 10^4$ | 330 | 110 |
| 28 | $Cr_2O_3$ | 0 | 0.99 | 6800 | 4.3 | $1 \times 10^3$ | 250 | 130 |
| 29 | " | 0.02 | 0.98 | 3260 | 1.1 | $1 \times 10^4$ | 430 | 91 |
| 30 | " | 0.1 | 0.98 | 2700 | 0.8 | $3.2 \times 10^4$ | 800 | 80 |
| 31 | " | 0.3 | 0.99 | 2900 | 0.7 | $2.8 \times 10^4$ | 550 | 85 |
| 32 | " | 0.5 | 0.97 | 3060 | 0.7 | $2 \times 10^4$ | 400 | 95 |
| 33 | " | 0.7 | 0.98 | 2000 | 1.2 | $2.2 \times 10^4$ | 310 | 120 |
| 34 | $MnCO_3$ $Cr_2O_3$ | 0.01 0.01 | 0.97 | 3630 | 1.0 | $1 \times 10^4$ | 450 | 90 |
| 35 | $MnCO_3$ $Cr_2O_3$ | 0.2 0.2 | 0.99 | 3700 | 0.7 | $3 \times 10^4$ | 570 | 83 |
| 36 | $MnCO_3$ $Cr_2O_3$ | 0.4 0.4 | 0.98 | 2920 | 1.3 | $1 \times 10^4$ | 270 | 130 |
| 37 | $MnCO_3$ $Cr_2O_3$ | 0.03 0.05 | 0.98 | 2360 | 0.8 | $3.5 \times 10^4$ | 910 | 78 |
| 38 | $SiO_2$ | 0.1 | 0.97 | 3790 | 1.2 | $1 \times 10^4$ | 490 | 90 |
| 39 | $La_2O_3$ | 0.1 | 0.97 | 3340 | 1.0 | $1 \times 10^4$ | 530 | 85 |
| 40 | $Nb_2O_5$ | 0.1 | 0.98 | 3100 | 1.5 | $1.5 \times 10^4$ | 800 | 80 |
| 41 | $Fe_2O_3$ | 0.1 | 0.98 | 3200 | 2 | $1 \times 10^4$ | 780 | 82 |
| 42 | clay | 0.05 | 0.98 | 2900 | 1.5 | $2 \times 10^4$ | 600 | 85 |
| 43 | Co | 0.1 | 0.98 | 2700 | 1.2 | $1 \times 10^4$ | 560 | 85 |

EXAMPLE 4

Non-linear dielectric elements having the compositions shown in the following table, were produced by the same procedure as in Example 1.

TABLE III

| Sample No. | Proportion of Ingredients (mol %) | | | |
|---|---|---|---|---|
| | $BaTiO_3$ | $BaSnO_3$ | y/z | x |
| 44 | 100 | 0 | 0.98 | 1.00 |
| 45 | 98 | 2 | 0.98 | 0.98 |
| 46 | 96 | 4 | 0.98 | 0.96 |
| 47 | 90 | 10 | 0.98 | 0.90 |
| 48 | 84 | 16 | 0.98 | 0.84 |

The pulse voltage was measured at a temperature of from $-30°$ to $90°$ C.

Figure 8:
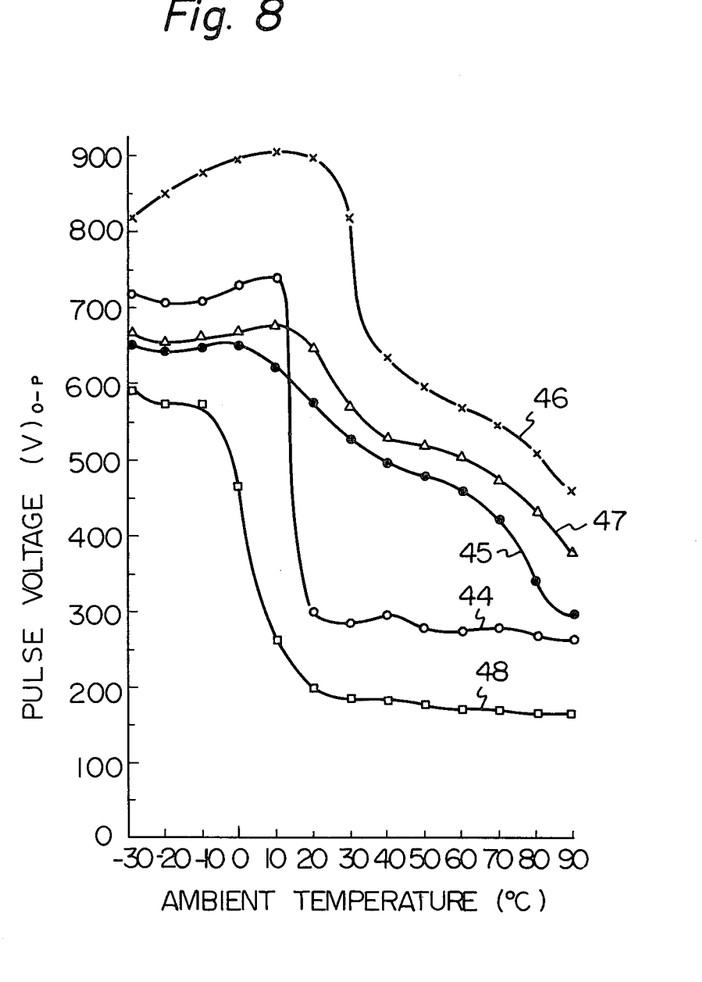
FIG. 8 is a graph indicating the relationships between the ambient temperature and pulse voltages generated by the non-linear dielectric compositions having a formula of $Ba(Ti_xSn_{1-x})O_3$.

As will be apparent from FIG. 8, wherein the pulse voltage and the ambient temperature are shown, the temperature dependence of the non-dielectric elements (sample Nos. 45 through 47) according to the present invention is stable.

EXAMPLE 5

Figure 9:
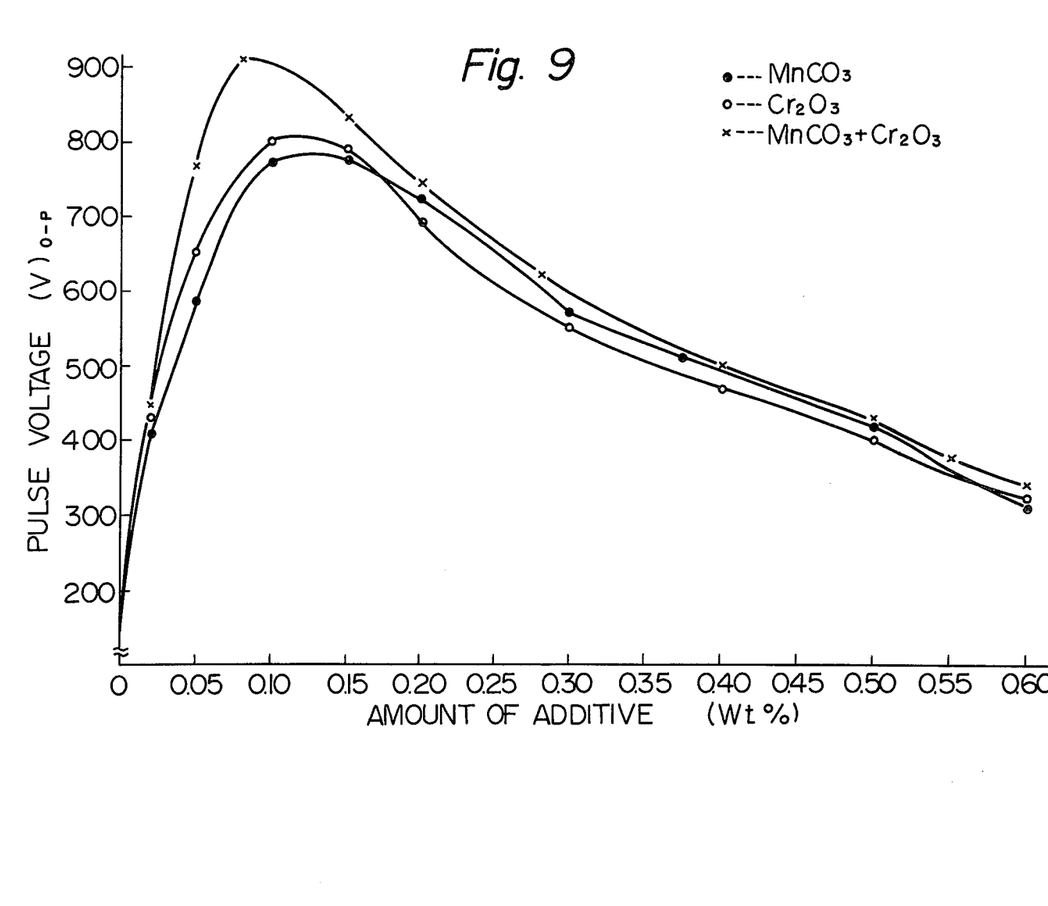
FIG. 9 is a graph indicating the relationships between the pulse voltage and amount of additives.

The non-linear dielectric elements of this example, which were produced by the same procedure as in Example 1, consisted of 100% by weight of $Ba_{0.97}(Ti\ 0.94\ Sn\ 0.06)_{1.00}O_3$ and from 0.02 to 0.60% by weight of an additive. The pulse voltage was measured 20° C. The measurement result is shown in FIG. 9, wherein the curves -●- and -o- indicate additive added to the $Ba_{0.97}(Ti\ 0.94\ Sn\ 0.06)_{1.00}O_3$ in the form of $MnCO_3$ and $Cr_2O_3$, respectively, and the curve -x- indicates an additive of combination of the $MnCO_3$ and $Cr_2O_3$.

What we claim is:

1. A non-linear dielectric element utilizing the non-linearity of the dielectric constant that depends on an electric field applied thereto consisting of a polycrystal which is mainly composed of $BaTiO_3$ and has the chemical composition expressed by the formula $A_yB_zO_3$, wherein the molar ratio of y/z ranges from 0.92 to 0.99, said composition of $A_yB_zO_3$ is $Ba_y(Ti_xSn_{1-x})_zO_3$, the amount (x) of titanium is in the range of from 0.90 to 0.98 and the polycrystal further includes at least one oxide selected from the group consisting of manganese oxide and chromium oxide in an amount of from 0.02 to 0.5% based on 100% by weight of said $A_yB_zO_3$ composition.

2. A non-linear dielectric element according to claim 1, wherein said molar ratio of y/z ranges from 0.95 to 0.98.

3. A non-linear dielectric element according to claim 1, wherein said amount (x) is from 0.92 to 0.96.

4. A non-linear dielectric element as claimed in claim 1 wherein said at least one oxide is in an amount in the range of from 0.03 to 0.3% by weight.

5. A non-linear dielectric element according to claim 1, wherein not more than 10 molar % of the barium of said chemical composition of $Ba_y(Ti_xSn_{1-x})_zO_3$ is replaced by at least one element selected from the group consisting of strontium, calcium and lead.

6. A non-linear dielectric element according to claim 5, wherein the amount of said at least one element is from 0 to 6 molar %.

* * * * *

UNITED STATES PATENT AND TRADEMARK OFFICE
CERTIFICATE OF CORRECTION

PATENT NO. : 4,447,549
DATED : May 8, 1984
INVENTOR(S) : SHO MASUJIMA ET AL

It is certified that error appears in the above-identified patent and that said Letters Patent is hereby corrected as shown below:

On the cover page, Item [75], "Iwaya Shoichi" should be --- Shoichi Iwaya ---.

Signed and Sealed this

First Day of October 1985

[SEAL]

*Attest:*

*Attesting Officer*

DONALD J. QUIGG

*Commissioner of Patents and Trademarks—Designate*